(12) United States Patent
Sato et al.

(10) Patent No.: US 8,333,061 B2
(45) Date of Patent: Dec. 18, 2012

(54) EXHAUST GAS PURIFYING APPARATUS FOR INTERNAL COMBUSTION ENGINE

(75) Inventors: Daisuke Sato, Saitama (JP); Hidetaka Maki, Saitama (JP); Jun Iida, Saitama (JP); Eisaku Gosho, Saitama (JP); Hiroaki Nishino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1099 days.

(21) Appl. No.: 12/239,171

(22) Filed: Sep. 26, 2008

(65) Prior Publication Data

US 2009/0084097 A1    Apr. 2, 2009

(30) Foreign Application Priority Data

Oct. 1, 2007    (JP) ................................. 2007-257418

(51) Int. Cl.
*F01N 3/00* (2006.01)
*F02B 27/04* (2006.01)

(52) U.S. Cl. .......................................... 60/277; 60/273

(58) Field of Classification Search ................... 60/273, 60/277, 286, 295
See application file for complete search history.

(56) References Cited

U.S. PATENT DOCUMENTS

| 6,928,809 | B2 * | 8/2005 | Inoue et al. | 60/297 |
|---|---|---|---|---|
| 7,396,389 | B2 * | 7/2008 | Kariya et al. | 95/273 |
| 2003/0230075 | A1 * | 12/2003 | Saito et al. | 60/291 |
| 2005/0188686 | A1 * | 9/2005 | Saito et al. | 60/297 |
| 2005/0267670 | A1 * | 12/2005 | Ante et al. | 701/108 |
| 2005/0268597 | A1 * | 12/2005 | Kosaka | 60/277 |
| 2006/0032217 | A1 * | 2/2006 | Kondou et al. | 60/297 |
| 2006/0048507 | A1 * | 3/2006 | Tochikawa et al. | 60/295 |
| 2007/0251214 | A1 * | 11/2007 | Nishino et al. | 60/277 |

FOREIGN PATENT DOCUMENTS

| JP | 2003166411 A | * | 6/2003 |
|---|---|---|---|
| JP | 2004-518869 A |  | 6/2004 |
| JP | 2005-226519 A |  | 8/2005 |
| JP | 2005-307880 |  | 11/2005 |
| JP | 2005337040 A | * | 12/2005 |
| JP | 2006-022740 A |  | 1/2006 |
| WO | WO-02/073011 A1 |  | 9/2002 |

OTHER PUBLICATIONS

English Translation of JP2005337040A to Uneo et al.*

* cited by examiner

*Primary Examiner* — Thomas Denion
*Assistant Examiner* — Anthony Ayala Delgado
(74) *Attorney, Agent, or Firm* — Arent Fox LLP

(57) ABSTRACT

An exhaust gas purifying apparatus for an internal combustion engine, including a particulate filter provided in an exhaust passage of the engine; a pressure difference sensor for detecting a pressure difference between upstream and downstream side pressures of the particulate filter; an upstream side passage, which connects the pressure difference sensor and an upstream side with respect to the particulate filter of the exhaust passage; and a downstream side passage, which connects the pressure difference sensor and a downstream side with respect to the particulate filter of the exhaust passage. An exhaust gas flow rate is calculated according to an operating condition of the engine. A characteristic of change in the pressure difference, which is detected by the pressure difference detector and corresponds to a change in the exhaust gas flow rate, is detected. An abnormality of the downstream side passage is determined based on the characteristic of change in the pressure difference.

4 Claims, 6 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to an apparatus having a particulate filter (hereinafter referred to, as "DPF") which traps particulates (particulate matter) in exhaust gases of the internal combustion engine.

2. Description of the Related Art

Japanese Patent Laid-open No. 2005-307880 (JP'880) discloses an exhaust gas purifying apparatus having a DPF and a pressure difference sensor for detecting a pressure difference between an upstream side pressure and a downstream side pressure of the DPF. JP'880 further discloses a method for determining an abnormality in the pressure difference sensor. Specifically, an estimated value of an amount of particulates accumulated in the DPF (operating condition dependent estimated accumulation amount PMsm) is calculated according to an engine operating condition. An upper limit value and a lower limit vale of the pressure difference are calculated according to the operating condition dependent estimated accumulation amount PMsm, and the pressure difference detected by the pressure difference sensor is compared with the calculated upper and lower limit values. An abnormality of the pressure difference sensor is determined according to the comparison result.

The pressure difference sensor disclosed by JP'880 is connected to the upstream and downstream sides of the DPF in the exhaust pipe through an upstream side passage and a downstream side passage, respectively, which are provided to help facilitate the pressure detection. Even when an abnormality, such as a leak (disengagement) or clogging, has occurred in the downstream side passage, the pressure difference detected by the pressure difference sensor does not significantly differ from the pressure difference detected when the downstream side passage is normal. Therefore, it is difficult to detect an abnormality in the pressure difference sensor using the method sensor and method taught by JP'880, especially when an exhaust gas flow rate is relatively small.

SUMMARY OF THE INVENTION

The present invention was attained in contemplation of the above-described situation, and an aspect of the present invention is to provide an exhaust purifying apparatus, which can accurately determine an abnormality has occurred in the downstream side passage when the exhaust gas flow rate is relatively small.

To attain the above aspect, the present invention provides an exhaust gas purifying apparatus for an internal combustion engine, including a particulate filter provided in an exhaust passage of the engine, a pressure difference detector, an upstream side passage, a downstream side passage, an exhaust gas flow rate calculator, a change characteristic detector, and an abnormality determiner. The pressure difference detector detects a pressure difference ($\Delta Pdpf$) between an upstream side pressure and a downstream side pressure of the particulate filter. The upstream side passage connects the pressure difference detector and an upstream side with respect to the particulate filter of the exhaust passage. The downstream side passage connects the pressure difference detector and a downstream side with respect to the particulate filter of the exhaust passage. The exhaust gas flow rate calculator calculates an exhaust gas flow rate (Dvol) according to an operating condition of the engine. The change characteristic detector detects a characteristic of change in the pressure difference ($\Delta Pdpf$), which is detected by the pressure difference detector, corresponding to a change in the exhaust gas flow rate (Dvol). The abnormality determiner determines an abnormality of the downstream side passage based on the characteristic of change in the pressure difference ($\Delta Pdpf$).

With the above-described structural configuration of the present invention, the exhaust gas flow rate is calculated according to the operating condition of the engine; the characteristic of change in the pressure difference detected by the pressure difference detector corresponding to the change in the exhaust gas flow rate is detected; and an abnormality occurred in the downstream side passage is determined based on the characteristic of change in the pressure difference. It is confirmed that a change amount of the detected pressure difference corresponding to a change in the exhaust gas flow rate tends to become comparatively large when an abnormality has occurred in the downstream side passage. Accordingly, even when the exhaust gas flow rate is relatively small, an abnormality in the downstream side passage can accurately be determined by detecting the characteristic of change in the pressure difference.

Preferably, the change characteristic detector calculates a change degree parameter (ahat) indicative of a degree of a change in the pressure difference ($\Delta Pdpf$) corresponding to a change in the exhaust gas flow rate (Dvol), and the abnormality determiner determines that the downstream side passage (24) is abnormal when the change degree parameter (ahat) is greater than a determination threshold value (Thr).

With the above-described structural configuration of the present invention, the change degree parameter indicative of a degree of a change in the detected pressure difference corresponding to a change in the exhaust gas flow rate, is calculated, and the downstream side passage is determined to be abnormal if the change degree parameter is greater than a determination threshold value. Determination accuracy is improved by using a change degree parameter, which is obtained by statistically processing a plurality of the detected data (combination of the exhaust gas flow rate and the detected pressure difference).

Preferably, the abnormality determiner further includes an estimated particulate amount calculator for calculating an estimated particulate amount (Mpm), which is an estimated value of an amount of particulates trapped by the particulate filter, and sets the determination threshold value (Thr) to a greater value as the estimated particulate amount (Mpm) increases.

With the above-described structural configuration of the present invention, the estimated particulate amount, which is an estimated value of an amount of particulates trapped in the particulate filter, is calculated, and the determination threshold value is set to a greater value as the estimated particulate amount increases. Since the detected pressure difference increases as the estimated particulate amount increases, it is possible to perform accurate determination by setting the determination threshold value to a greater value as the estimated particulate amount increases.

Further, the present invention provides another exhaust gas purifying apparatus for an internal combustion engine, including a particulate filter provided in an exhaust passage of the engine, a first pressure difference detector, a first upstream side passage, a first downstream side passage, an exhaust gas purifier provided downstream of the particulate filter, a second pressure difference detector, a second upstream side passage, a second downstream side passage, and an abnormality determiner. The first upstream side passage connects the first pressure difference detector and an upstream side with respect to the particulate filter of the exhaust passage. The first downstream side passage connects the first pressure difference detector and a downstream side with respect to the particulate filter of the exhaust passage. The second pressure difference detector detects a pressure difference ($\Delta Ppc$) between an upstream side pressure and a downstream side pressure of the exhaust gas purifier. The second upstream side passage connects the second pressure difference detector and the first downstream side passage. The second downstream side passage connects the second pressure difference detector and a downstream side with respect to the exhaust gas purifier of the exhaust passage. The abnormality determiner determines that the first downstream side passage or the second upstream side passage is abnormal when the pressure difference ($\Delta Ppc$) detected by the second pressure difference detector is equal to or less than a predetermined pressure difference (DpcTH).

With the above-described structural configuration of the present invention, the pressure difference between the upstream side pressure and the downstream side pressure of the exhaust gas purifier provided downstream of the particulate filter, is detected. When the pressure difference is equal to or less than the predetermined pressure difference, it is determined that the first downstream side passage connected to the first pressure difference detector or the second upstream side passage connected to the second pressure difference detector is abnormal. The first downstream side passage is connected to the second upstream side passage. Accordingly, if any one of the first downstream side passage and the second upstream side passage has been disconnected, the upstream side pressure applied to the second pressure difference detector becomes equal to the atmospheric pressure, and the detected pressure difference consequently decreases. Therefore, when the detected pressure difference detected by the second pressure difference detector is equal to or less than the predetermined pressure difference, any one of the first downstream side passage and the second upstream side passage is determined to be abnormal. When any one of the first downstream side passage and the second upstream side passage is disconnected, the pressure difference detected by the second pressure difference detector decreases significantly. Therefore, the determination is performed accurately, even if the exhaust gas flow rate is relatively small.

DETAILED DESCRIPTION OF THE PREFERRED EMBODIMENTS

Preferred embodiments of the present invention will now be described with reference to the drawings.

First Embodiment

Figure 1:
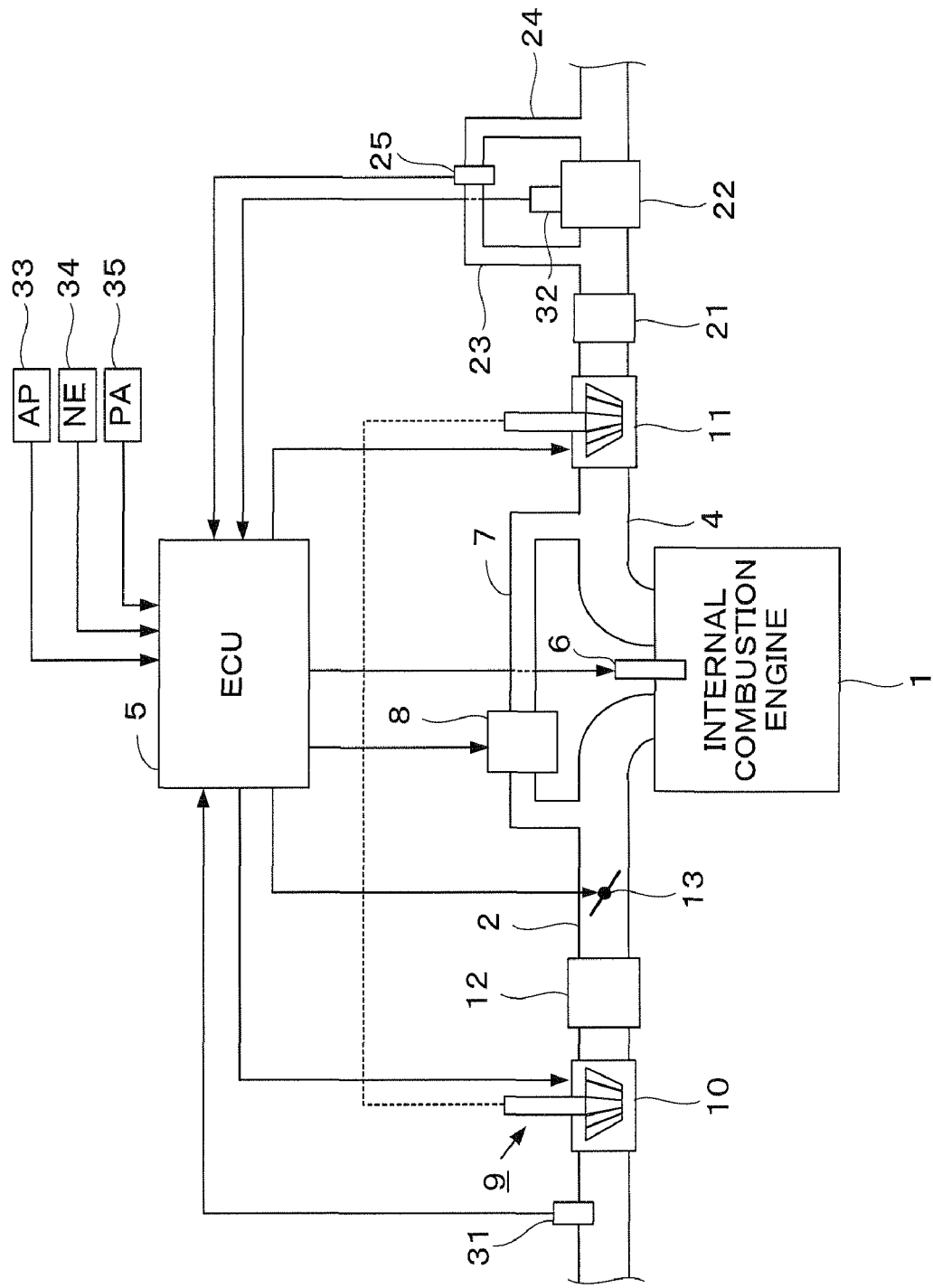
FIG. 1 is a schematic diagram of an internal combustion engine and a control system therefor according to a first embodiment of the present invention.

FIG. 1 is a schematic diagram of an internal combustion engine and a control system therefor according to a first embodiment of the present invention. An internal combustion engine 1 (hereinafter referred to as "engine") is a diesel engine in which fuel is injected directly into cylinders, and wherein each cylinder is provided with a fuel injection valve 6. Each fuel injection valve 6 is electrically connected to an electronic control unit 5 (hereinafter referred to as "ECU"). A valve opening time period and a valve opening timing of each fuel injection valve 6 are controlled by the ECU 5.

The engine 1 has an intake passage 2, an exhaust passage 4, and a turbocharger 9. The turbocharger 9 includes a turbine 11 and a compressor 10. The turbine 11 is driven by the kinetic energy of exhaust gases and the compressor 10, which is rotationally driven by the turbine 11, compresses the intake air.

The turbine 11 has a plurality of movable vanes (not shown), and is configured so that the rotational speed of the turbine 11 is adjusted by changing an opening of the movable vanes. The opening of the vanes in the turbine 11 is electro-magnetically controlled by the ECU 5.

The intake passage 2 is provided with an intercooler 12 for cooling pressurized air and an intake shutter (throttle valve) 13 for controlling the intake air amount. The intercooler 12 is located on the downstream side of the compressor 10. The intake shutter 13 is controlled to be opened/closed by the ECU 5 through an actuator (not shown).

An exhaust gas recirculation passage 7 for recirculating exhaust gases to the intake passage 2 is provided between the upstream side with respect to the turbine 11 of the exhaust passage 4 and the downstream side with respect to the intake shutter 13 of the intake passage 2. The exhaust gas recirculation passage 7 is provided with an exhaust gas recirculation control valve 8 (hereinafter referred to as "EGR valve") that controls an amount of exhaust gases that are recirculated. The EGR valve 8 is an electromagnetic valve having a solenoid and has a valve opening that is controlled by the ECU 5.

Downstream of the turbine 11, the exhaust passage 4 is provided with a catalytic converter 21 for purifying exhaust gases and a DPF 22. The DPF 22 is located downstream of the catalytic converter 21, which contains an oxidation catalyst for accelerating oxidation of hydrocarbon and carbon monoxide in the exhaust gases. Further, the catalytic converter 21 may include a well-known three-way catalyst.

The DPF 22 traps soot, which consists of particulates whose main component is carbon (C), in the exhaust gases when the exhaust gases pass through small holes in the filter wall. Specifically, the inflowing soot is accumulated on the surface of the filter wall and in the small holes in the filter wall. For example, ceramics, such as silicon carbide (SiC) or porous material, are used as the materials for the filter wall.

If the DPF 22 traps soot up to the upper limit of the soot trapping capacity, the exhaust pressure excessively rises and the DPF 22 is choked. Therefore, it is necessary to timely perform the regeneration process for burning the trapped soot. In the regeneration process, the post injection is performed for raising a temperature of the exhaust gases to the burning temperature of soot. The post injection is performed through the fuel injection valve 6 during the expansion stroke or the exhaust stroke. The fuel injected during post injection burns in the catalytic converter 21, which raises the temperature of the exhaust gases flowing into the DPF 22.

A pressure difference sensor 25 is provided for detecting a pressure difference ΔPdpf between the upstream side pressure and the downstream side pressure of the DPF 22. The pressure difference sensor 25 is connected to a portion of the exhaust passage 4 upstream of the DPF 22 through an upstream side passage 23 and is also connected to a portion of the exhaust passage 4 downstream of the DPF 22 through a downstream side passage 24. Further, the DPF temperature sensor 32, which detects a temperature Tdpf of the DPF 22 (the temperature of the DPF will be hereinafter referred to as "DPF temperature"), is provided in the DPF 22. The detection signals of the pressure difference sensor 25 and the DPF temperature sensor 32 are supplied to the ECU 5.

The intake passage 2 is provided with an intake air flow rate sensor 31 which detects an intake air flow rate Maf of the engine 1, and a detection signal is supplied to the ECU 5. Further, an accelerator sensor 33, an engine rotational speed sensor 34, an atmospheric pressure sensor 35, and a coolant temperature sensor (not shown) are connected to the ECU 5. The accelerator sensor 33 detects a depression amount AP of an accelerator pedal of the vehicle driven by the engine 1 (the depression amount will be hereinafter referred to as "accelerator operation amount"). The engine rotational speed sensor 34 detects an engine rotational speed NE. The atmospheric pressure sensor 35 detects an atmospheric pressure PA. The coolant temperature sensor detects an engine coolant temperature TW. The detection signals of the sensors 31 and 33-35 are supplied to the ECU 5.

The ECU 5 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores computation results, and the like. The output circuit supplies driving signals to the fuel injection valve 6, the EGR valve 8, and the like.

In this embodiment, the ECU 5 determines an abnormality, such as disconnection, clogging or the like, of the downstream side passage 24, which is connected to the pressure difference sensor 25. The abnormality determination is performed with the method described below.

Figure 2:
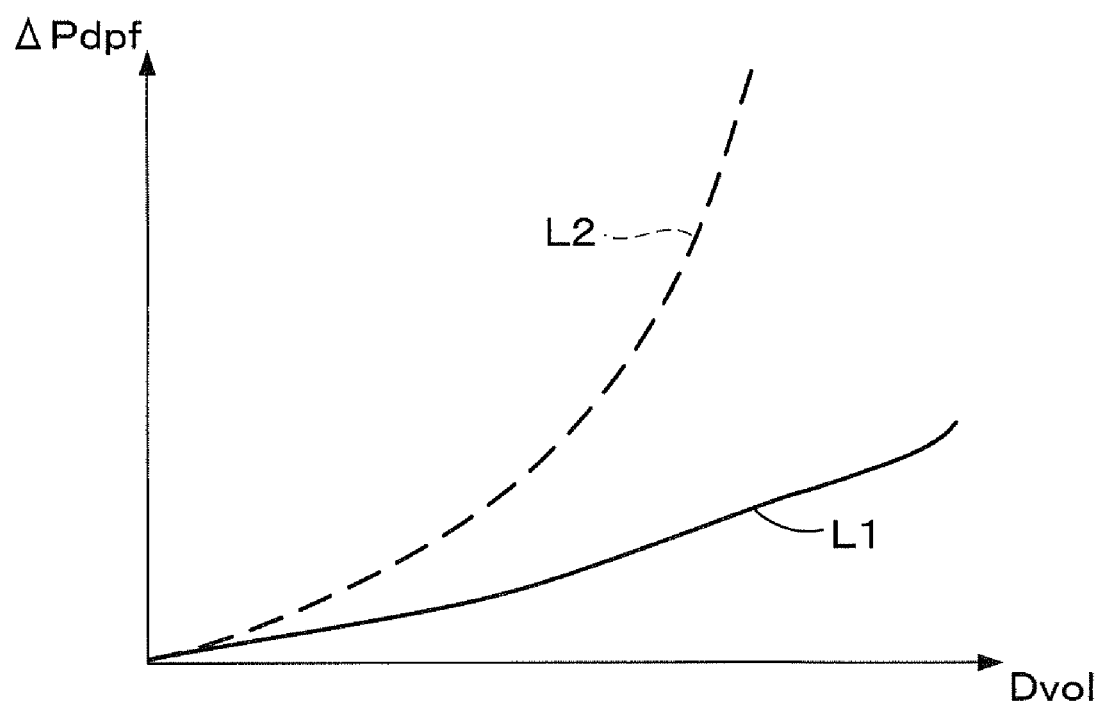
FIG. 2 is a graph illustrating a relationship between an exhaust gas volume flow rate and a detected pressure difference that is used in an abnormality determination method of the first embodiment.

FIG. 2 is a graph illustrating a relationship between an exhaust gas volume flow rate Dvol and the pressure difference ΔPdpf detected by the pressure difference sensor 25 that are used in the method for determining if an abnormality exists. The relationship is approximated using a quadratic curve. The solid line L1 in FIG. 2 corresponds to a case where the downstream side passage 24 is normal, and the dashed line L2 in FIG. 2 corresponds to a case where the downstream side passage 24 is abnormal (disconnection of the passage 24 has occurred). Therefore, a determination can be made that an abnormality occurred in the downstream side passage 24 by detecting a difference between the two relationships shown by lines L1 and L2. It is to be noted that when the downstream side passage 24 is clogged, the pressure difference ΔPdpf increases in the whole range of the exhaust gas volume flow rate Dvol and the corresponding quadratic curve has an inclination like line L2 of FIG. 2. That is, the inclination becomes greater than that of the curve obtained when the downstream side passage 24 is normal. Therefore, it is possible to detect not only the disconnection of the downstream side passage 24 but also the clogging using the same method.

If expressing the above-mentioned quadratic curve with equation (1), a value of the coefficient "a" of the square "x" corresponding to an abnormal state (i.e., the line L2) is greater than a value corresponding to a normal state (i.e., the line L1). In equation (1), the parameter "x" corresponds to the exhaust gas volume flow rate Dvol and the parameter "y" corresponds to the pressure difference ΔPdpf. Therefore, in this embodiment, the statistical processing with a least squares method is performed with respect to a plurality of data of the exhaust gas volume flow rate Dvol and the corresponding pressure difference ΔPdpf, to calculate an estimated value ahat of the coefficient "a". The estimated value ahat is used as a parameter (hereinafter referred to as "change degree parameter") indicative of a degree of a change in the pressure difference ΔPdpf corresponding to a change in the exhaust gas volume flow rate Dvol. The abnormality determination of the downstream side passage 24 is performed by comparing the change degree parameter ahat with a determination threshold value Thr.

$$y = ax^2 + bx + c \quad (1)$$

The change degree parameter ahat is calculated by equation (2). In equation (2), "n" is a number of data, and "Σ" indicates an accumulating calculation with respect to the data of "n".

$$ahat = -\frac{\frac{\sum x^2 \sum y - n \sum x^2 y}{n \sum x^3 - \sum x^2 \sum x} - \frac{\sum x \sum y - n \sum xy}{n \sum x^2 - (\sum x)^2}}{\frac{n \sum x^4 - (\sum x^2)^2}{n \sum x^3 - \sum x^2 \sum x} - \frac{n \sum x^3 - \sum x^2 \sum x}{n \sum x^2 - (\sum x)^2}} \quad (2)$$

Figure 3:
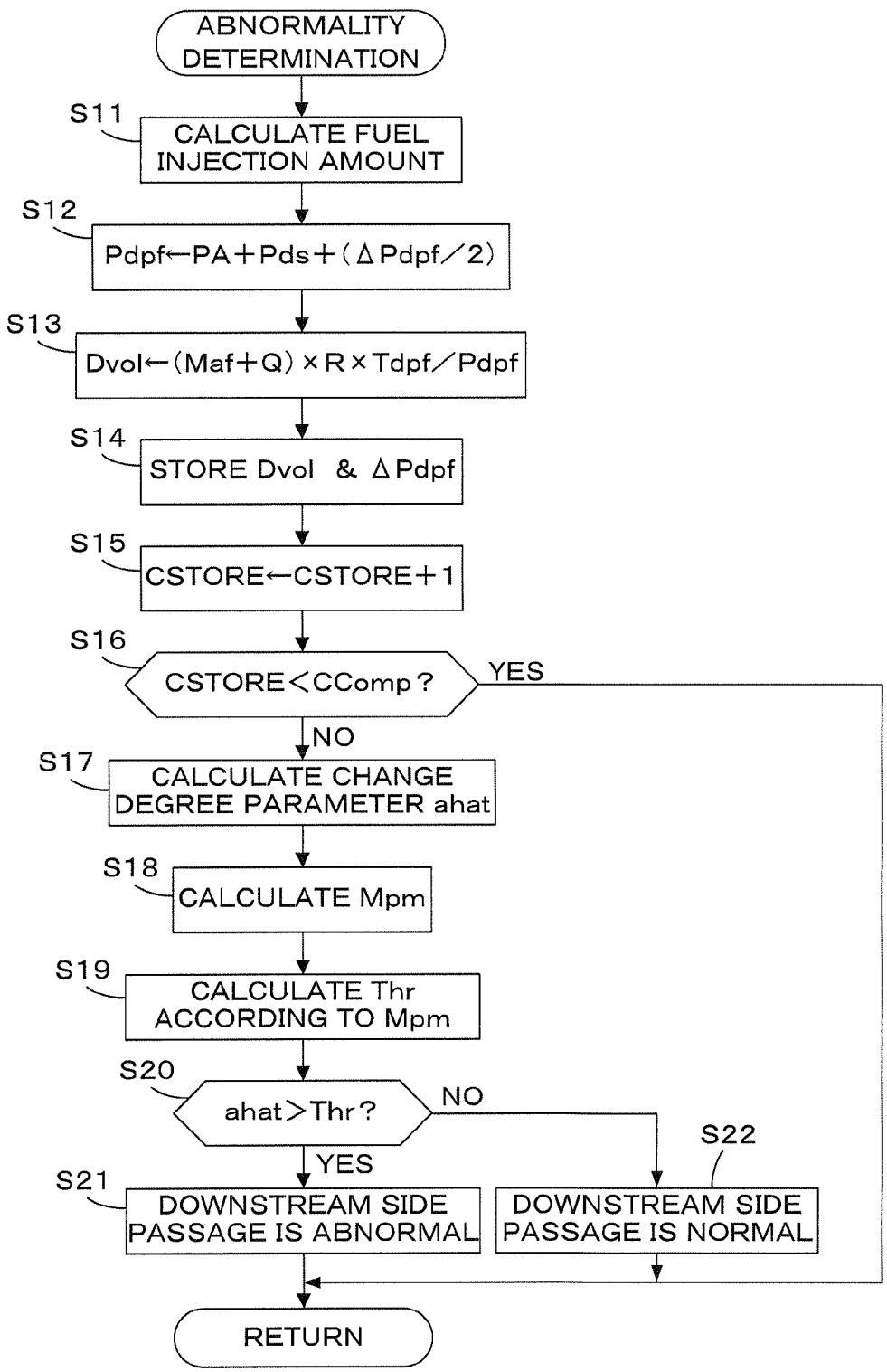
FIG. 3 is a flowchart of an abnormality determination process.

FIG. 3 is a flowchart of the abnormality determination process that is executed by the CPU in the ECU 5 at predetermined time intervals (e.g., 100 milliseconds).

In step S11, a fuel injection amount Q per unit time period is calculated according to a demand torque TRQ of the engine. The demand torque TRQ is calculated to increase as the accelerator pedal operation amount AP increases. In step S12, the detected atmospheric pressure PA and pressure difference ΔPdpf are applied to equation (3), to calculate an average DPF pressure Pdpf. In equation (3), "Pds" is a pressure loss from an area immediately downstream of the DPF 22 to a tail pipe. The pressure loss Pds is set to a predetermined value.

$$Pdpf = PA + Pds + (\Delta Pdpf/2) \quad (3)$$

In step S13, the detected intake air flow rate Maf and DPF temperature Tdpf [K], and the fuel injection amount q and average DPF pressure Pdpf calculated in steps S11 and S12, are applied to equation (4), to calculate the exhaust gas volume flow rate Dvol. In equation (4), "R" is a gas constant [J/(kg·K)] of the exhaust gases.

$$Dvol = (Maf + Q) \times R \times Tdpf/Pdpf \quad (4)$$

In step S14, the calculated exhaust gas volume flow rate Dvol and the corresponding pressure difference ΔPdpf are stored in the memory. In step S15, a data counter CSTORE is incremented by "1". Subsequently, it is determined whether the value of the data counter CSTORE is equal to or less than a predetermined value CComp (e.g., 10) (step S16). Since the answer to step S16 is initially affirmative (YES), the process immediately ends.

Figure 4:
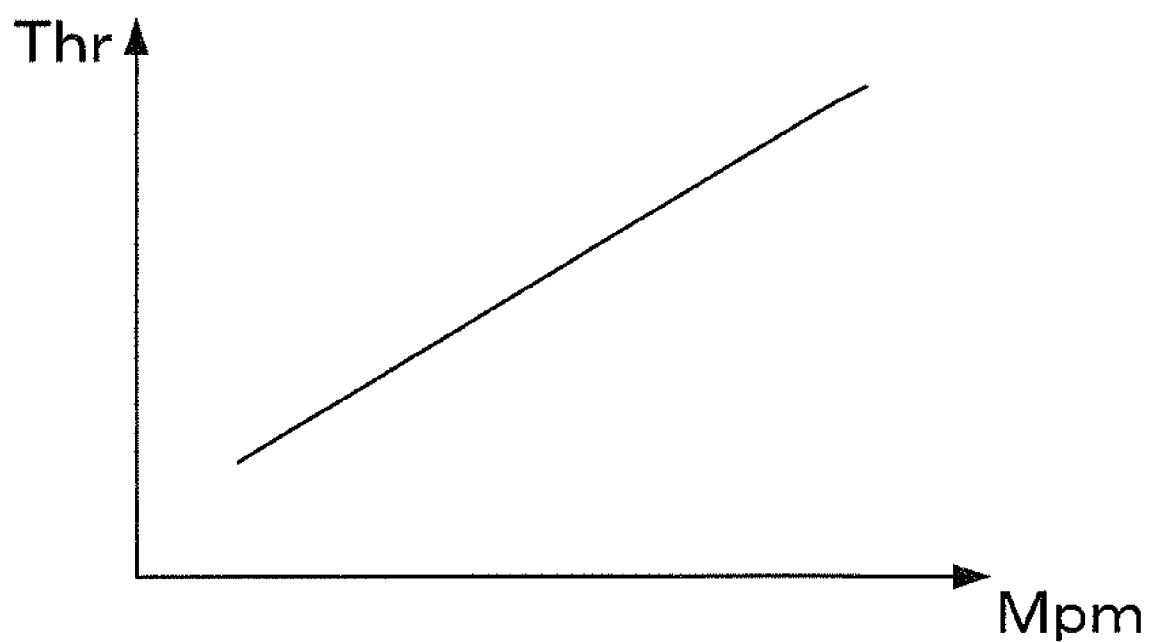
FIG. 4 is a graph illustrating a relationship between a determination threshold value and a trapped particulate amount estimate that is used in the process of FIG. 3.

If the value of the data counter CSTORE reaches the predetermined number CComp, the process proceeds from step S16 to step S17, in which the change degree parameter ahat is calculated by equation (2). In step S18, an incremental amount Dpm of the trapped particulate amount in the DPF 22 per predetermined time period is calculated according to the engine rotational speed NE and the fuel injection amount Q. Further, the estimated trapped particulate amount Mpm is calculated by integrating the incremental amount Dpm. In step S19, a determination threshold value Thr table shown in FIG. 4 is retrieved according to the estimated trapped particulate amount Mpm, to calculate the determination threshold value Thr. The determination threshold value Thr table is set so that the determination threshold value Thr increases as the estimated trapped particulate amount Mpm increases.

In step S20, it is determined whether the change degree parameter ahat is greater than the determination threshold value Thr. If the answer to step S20 is negative (NO), the downstream side passage 24 is determined to be normal (step S22). If the change degree parameter ahat is greater than the determination threshold value Thr in step S20, the downstream side passage 24 is determined to be abnormal (step S21).

According to the process of FIG. 3, the change degree parameter ahat indicative of a degree of a change in the detected pressure difference $\Delta$Pdpf corresponding to a change in the exhaust gas volume flow rate Dvol, is calculated. If the change degree parameter ahat is greater than the determination threshold value Thr, the downstream side passage 24 is determined to be abnormal. Since the change degree parameter ahat is calculated by applying the least squares method to the data of the predetermined number CComp, an abnormality of the downstream side passage 24 is accurately detected even in the state where the exhaust gas volume flow rate Dvol is small.

Further, the detected pressure difference $\Delta$Pdpf increases as the particulate amount trapped by the DPF 22 increases. Accordingly, by setting the determination threshold value Thr to a greater value as the particulate amount trapped by the DPF 22 increases, the determination is accurately performed.

In this embodiment, the pressure difference sensor 25 corresponds to a pressure difference detecting means, and the intake air flow rate sensor 31, the DPF temperature sensor 32, the pressure difference sensor 25, the atmospheric pressure sensor 35, and the ECU 5 correspond to an exhaust gas flow rate calculating means. Further, the ECU 5 corresponds to the change characteristic detecting means, the abnormality determining means, and the estimated particulate amount calculating means. Specifically, steps S11 to S13 of FIG. 3 correspond to the exhaust gas flow rate calculating means; steps S14 to S17 correspond to the change characteristic detecting means; steps S18 to S22 correspond to the abnormality determining means; and step S18 corresponds to the estimated particulate amount calculating means.

Second Embodiment

Figure 5:
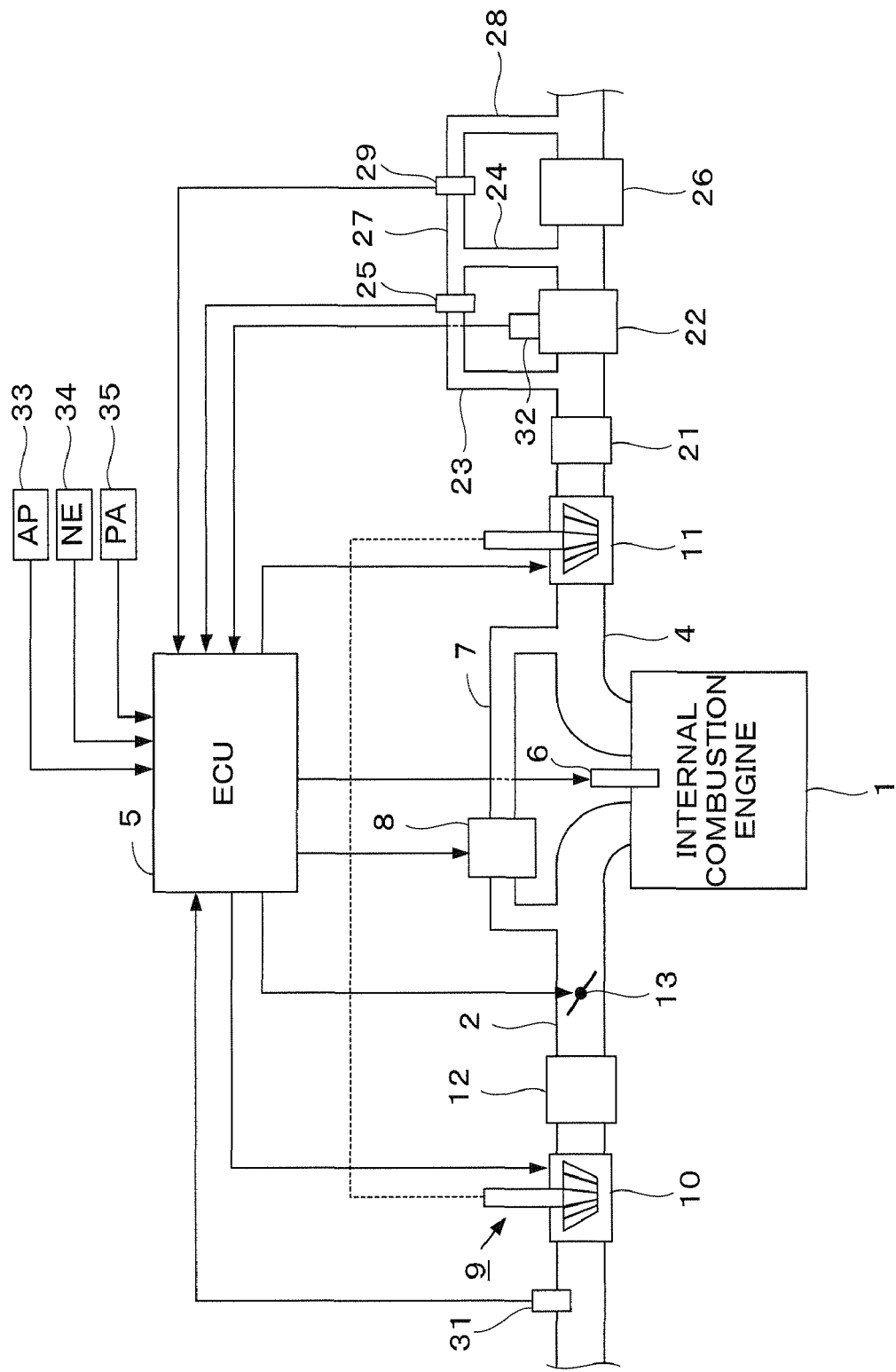
FIG. 5 is a schematic diagram an internal combustion engine and a control system therefor according to a second embodiment of the present invention.

FIG. 5 shows a configuration of an internal combustion engine and a control system therefor according to a second embodiment of the present invention. The embodiment of the invention shown in FIG. 5 differs from the embodiment of the invention shown in FIG. 1 in the following manner. That is, in the configuration of the invention shown in FIG. 5, a lean NOx catalyst 26 is provided downstream of the DPF 22 in the exhaust passage 4, and further, a pressure difference sensor 29, an upstream side passage 27, and a downstream side passage 28 are provided. The pressure difference sensor 29 detects a pressure difference $\Delta$Ppc between the upstream side pressure and the downstream side pressure of the lean NOx catalyst 26. The upstream side passage 27 connects the pressure difference sensor 29 with the downstream side passage 24. The downstream side passage 28 connects the pressure difference sensor 29 with the downstream side with respect to the lean NOx catalyst 26 of the exhaust passage 4. Except for the differences described above, the configuration of the invention shown in FIG. 5 is the same as that shown in FIG. 1. In the explanation described below, the constituent elements 23 to 25 shown in the first embodiment will be referred to, respectively, as a first upstream side passage 23, a first downstream side passage 24, and a first pressure difference sensor 25 in the second embodiment. The constituent elements 27 to 29 in the second embodiment will be referred to, respectively, as a second upstream side passage 27, a second downstream side passage 28, and a second pressure difference sensor 29.

In the second embodiment, an abnormality which occurs in the first downstream side passage 24 or the second upstream side passage 27 is determined based on the pressure difference $\Delta$Ppc detected by the second pressure difference sensor 29.

Figure 6:
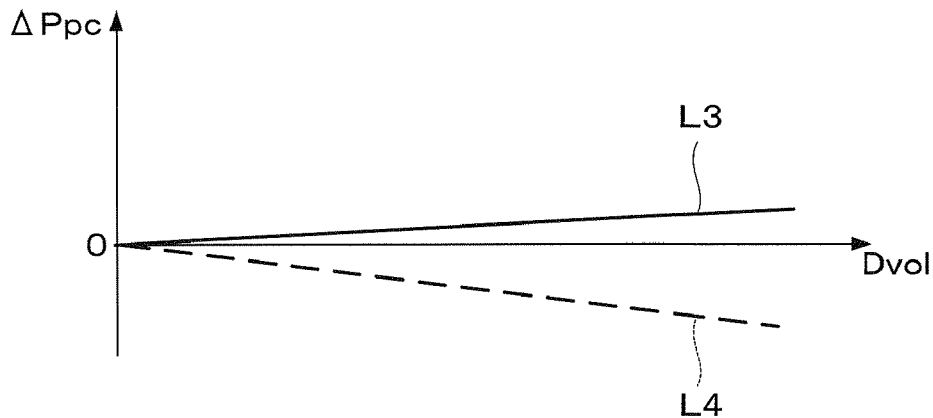
FIG. 6 is a graph illustrating a relationship between the exhaust gas volume flow rate and the detected pressure difference that is used in an abnormality determination method of the second embodiment.

FIG. 6 is the graph showing a relationship between the exhaust gas volume flow rate Dvol and the pressure difference $\Delta$Ppc for illustrating the abnormality determination method. The solid line L3 corresponds to a case where the first downstream side passage 24 and the second upstream side passage 27 are normal, and the dashed line L4 corresponds to a case where the first downstream side passage 24 or the second upstream side passage 27 is disconnected. In FIG. 6, the pressure difference $\Delta$Ppc is defined by a difference between the upstream side pressure Ppcu and the downstream side pressure Ppcl (Ppcu−Ppcl).

When the first downstream side passage 24 or the second upstream side passage 27 is disconnected, the upstream side pressure Ppcu becomes equal to the atmospheric pressure PA, and the downstream side pressure Ppcl becomes higher than the atmospheric pressure PA due to a pressure loss caused by the muffler and the like provided downstream of the lean NOx catalyst 26. Therefore, the pressure difference $\Delta$Ppc always takes a negative value regardless of the exhaust gas volume flow rate Dvol. Accordingly, if the pressure difference $\Delta$Ppc is less than a predetermined pressure difference DPpcTH set to "0" or a value in the vicinity of "0", it possible to determine that the first downstream side passage 24 or the second upstream side passage 27 is disconnected.

Figure 7:
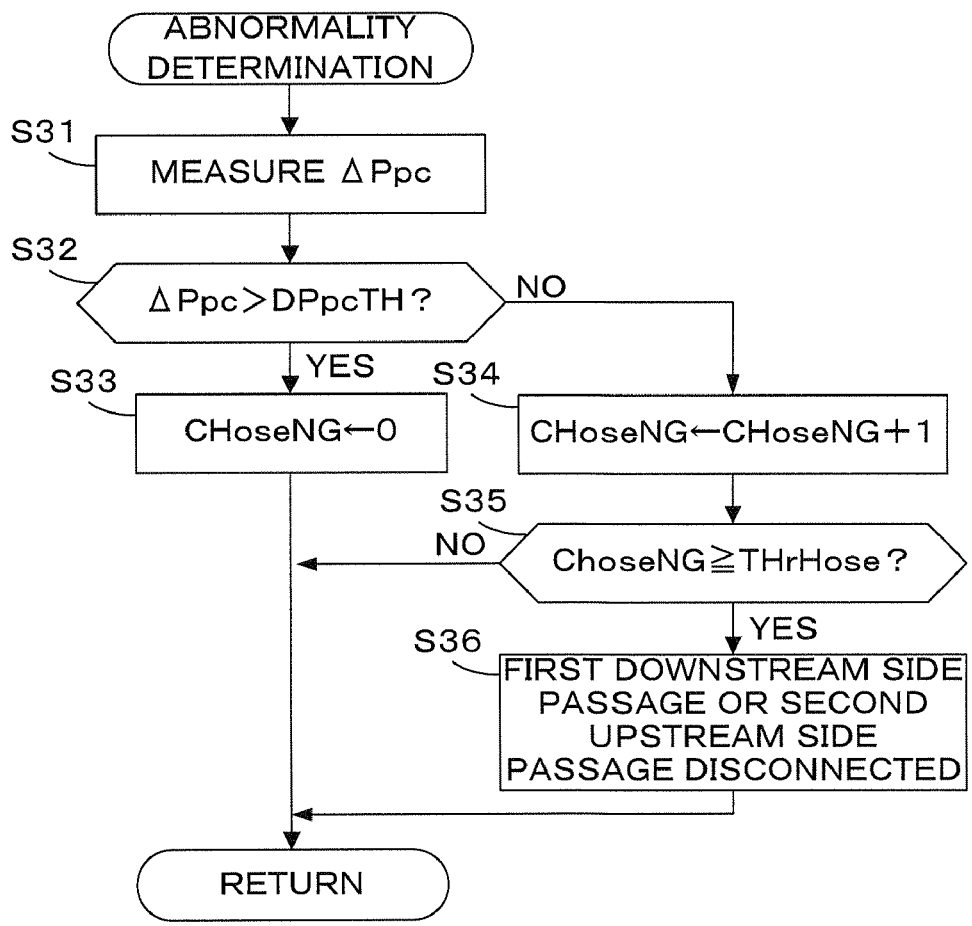
FIG. 7 shows a flowchart of an abnormality determination process.

FIG. 7 is a flowchart of a process for performing the abnormality determination with the above-described method, wherein the process is executed by the CPU in the ECU 5 at predetermined time intervals.

In step S31, the pressure difference $\Delta$Ppc is measured with the second pressure difference sensor 29. In step S32, it is determined whether the pressure difference $\Delta$Ppc is greater than the predetermined pressure difference DPpcTH. If the answer to step S32 is affirmative (YES), the value of a determination counter CHoseNG is set to "0" (step S33), and the process ends.

If $\Delta$Ppc is equal to or less than DPpcTH in step S32, the determination counter CHoseNG is incremented by "1" (step S34), and it is determined whether the value of the determination counter CHoseNG is equal to or greater than a predetermined value ThrHose (e.g., 10) (step S35). If the answer to step S35 is negative (NO), the process immediately ends. If the value of the determination counter CHoseNG reaches the predetermined value ThrHose, it is determined that the first downstream side passage 24 or the second upstream side passage 27 is disconnected (step S36).

As described above, in the present embodiment, if the pressure difference ΔPpc, which is detected by the second pressure difference sensor 29 provided with the lean NOx catalyst 26 located downstream of the DPF 22, is equal to or less than the predetermined pressure difference DPpcTH, the first downstream side passage 24 or the second upstream side passage 27 is determined to be disconnected. If the first downstream side passage 24 or the second upstream side passage 27 is disconnected, an amount of decrease in the pressure difference ΔPpc becomes relatively large. Therefore, the determination is accurately performed regardless of the exhaust flow gas rate.

In this embodiment, the first pressure difference sensor 25 and the second pressure difference sensor 29, respectively, correspond to the first pressure difference detecting means and the second pressure difference detecting means. The ECU 5 corresponds to the abnormality determining means. Specifically, the process shown in FIG. 7 corresponds to the abnormality determining means.

The present invention is not limited to the embodiments described above, and various modifications may be made thereto. For example, in the first embodiment, the relationship between the exhaust gas volume flow rate Dvol and the pressure difference ΔPdpf is approximated by the quadratic curve. Alternatively, the relationship may be approximated by a straight line. In such a situation, a change degree parameter a2hat corresponding to a coefficient a2 in equation (5) is calculated by the least squares method. If the change degree parameter a2hat exceeds a determination threshold value Thr2, which is set according to the estimated trapped particulate amount Mpm, it is determined that an abnormality has occurred.

$$y = a2 \times x + b2 \quad (5)$$

Further, the abnormality determination method of the first embodiment may be applied to the internal combustion engine having an exhaust system configured as shown in FIG. 5, and the abnormality determination method shown in the second embodiment may be applied additionally.

Further, the present invention can be applied also to an exhaust gas purifying apparatus for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:
   a particulate filter provided in an exhaust passage of said engine;
   pressure difference detecting means for detecting a pressure difference between an upstream side pressure and a downstream side pressure of said particulate filter;
   an upstream side passage, connecting said pressure difference detecting means and an upstream side of said exhaust passage relative to said particulate filter;
   a downstream side passage connecting said pressure difference detecting means and a downstream side of said exhaust passage relative to said particulate filter;
   exhaust gas flow rate calculating means for calculating an exhaust gas flow rate according to an operating condition of said engine;
   change characteristic detecting means for detecting a characteristic of change in the pressure difference, which is detected by said pressure difference detecting means, relative to a change in the exhaust gas flow rate; and
   abnormality determining means for determining an abnormality of said downstream side passage based on the characteristic of change in the pressure difference,
   wherein said change characteristic detecting means calculates a change degree parameter indicative of a degree of a change in the pressure difference relative to a change in the exhaust gas flow rate by performing a statistical processing with respect to a plurality of data of the exhaust gas flow rate and the corresponding detected pressure difference, and said abnormality determining means determines that said downstream side passage is abnormal when said change degree parameter is greater than a determination threshold value.

2. The exhaust gas purifying apparatus according to claim 1, wherein estimated particulate amount calculating means comprise means for calculating an estimated particulate amount, which is an estimated value of an amount of particulates trapped by said particulate filter, and sets the determination threshold value to a greater value as the estimated particulate amount increases.

3. A method for detecting an abnormality of an exhaust gas purifying apparatus for an internal combustion engine, said exhaust gas purifying apparatus comprising:
   a particulate filter provided in an exhaust passage of said engine;
   a pressure difference sensor for detecting a pressure difference between an upstream side pressure and a downstream side pressure of said particulate filter;
   an upstream side passage connecting said pressure difference sensor and an upstream side of said exhaust passage relative to said particulate filter; and
   a downstream side passage connecting said pressure difference sensor and a downstream side of said exhaust passage relative to said particulate filter,
   said method comprising the steps of:
   a) calculating an exhaust gas flow rate according to an operating condition of said engine, which includes the temperature of said particulate filter detected by said particulate temperature sensor;
   b) detecting a characteristic of change in the pressure difference, which is detected by said pressure difference sensor, corresponding to a change in the exhaust gas flow rate;
   c) determining an abnormality of said downstream side passage based on the characteristic of change in the pressure difference; and
   d) calculating a change degree parameter indicative of a degree of a change in the pressure difference corresponding to a change in the exhaust gas flow rate by performing a statistical processing with respect to a plurality of data of the exhaust gas flow rate and the corresponding detected pressure difference, wherein said downstream side passage is determined to be abnormal when said change degree parameter is greater than a determination threshold value;
   wherein determining the abnormality of the downstream side passage comprises:
   e) calculating an estimated particulate amount, which is an estimated value of an amount of particulates trapped by said particulate filter; and f) setting the determination threshold value to a greater value as the estimated particulate amount increases.

4. A computer program embodied on a memory circuit for causing a computer to implement a method for detecting an abnormality of an exhaust gas purifying apparatus for an internal combustion engine, said exhaust gas purifying apparatus comprising:

a particulate filter provided in an exhaust passage of said engine;

a pressure difference sensor for detecting a pressure difference between an upstream side pressure and a downstream side pressure of said particulate filter;

an upstream side passage connecting said pressure difference sensor and an upstream side of said exhaust passage relative to said particulate filter; and a downstream side passage connecting said pressure difference sensor and a downstream side of said exhaust passage, said computer program of said memory circuit, when executed, performing the steps of:

a) calculating an exhaust gas flow rate according to an operating condition of said engine;

b) detecting a characteristic of change in the pressure difference, which is detected by said pressure difference detecting means, corresponding to a change in the exhaust gas flow rate; and c) determining an abnormality of said downstream side passage based on the characteristic of change in the pressure difference; and d) calculating a change degree parameter indicative of a degree of a change in the pressure difference corresponding to a change in the exhaust gas flow rate by performing a statistical processing with respect to a plurality of data of the exhaust gas flow rate and the corresponding detected pressure difference, wherein said downstream side passage is determined to be abnormal when said change degree parameter is greater than a determination threshold value;

wherein determining the abnormality of the downstream side passage includes:

e) calculating an estimated particulate amount, which is an estimated value of an amount of particulates trapped by said particulate filter; and f) setting the determination threshold value to a greater value as the estimated particulate amount increases.

* * * * *